United States Patent Office 3,500,008
Patented Mar. 10, 1970

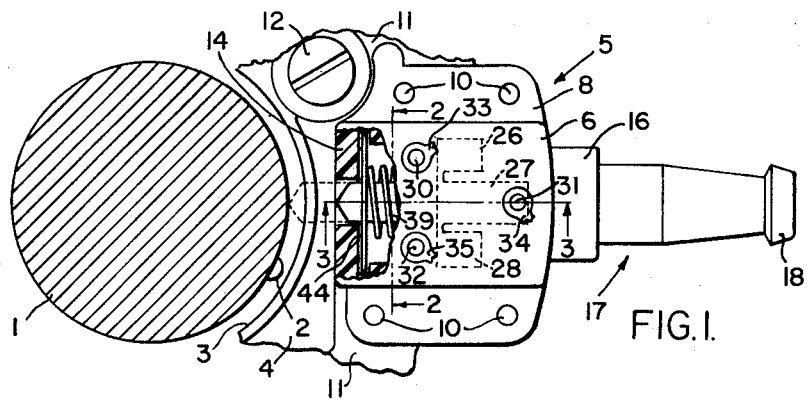

3,500,008
LATCHABLE RECIPROCABLE SWITCH CONSTRUCTION
Gerald L. McClure, Warren, Mich., assignor to Essex International, Inc., a corporation of Michigan
Filed Feb. 20, 1968, Ser. No. 706,836
Int. Cl. H01h 9/02
U.S. Cl. 200—61.54
13 Claims

ABSTRACT OF THE DISCLOSURE

A switch having a casing provided with fixed contacts engageable and disengageable by a movable conductor having spring contact fingers supported on a reciprocable operator mounted in the casing for movement between two positions in the first of which one end of the operator extends beyond the casing and in the second of which the opposite end of the operator extends beyond the casing for engagement by a movable cam. A biasing spring exerts a force on the operator urging it constantly toward the first position, the force of the spring being overcome when the operator is in its second position by the reaction between the spring contact fingers and the fixed contacts and by a resilient latch which lies athwart the operator and yieldably engages detents on the operator. The biasing spring also acts on the latch and maintains it in an operative position. Upon engagement of the cam with the operator the latching forces acting on the operator are overcome and the spring is enabled to return the operator to its first position.

---

The invention disclosed herein relates to a reciprocable switch which is particularly adapted for use in automotive vehicle signaling systems of the hazard warning type wherein signaling indicators at the left-hand and right-hand sides of the vehicle are flashed simultaneously to warn drivers of approaching vehicles of a potentially hazardous condition. The signaling indicators are energized by movement of an actuator from an inoperative position to an operative position, the actuator having movable contacts which move with the actuator so as to engage and disengage selected fixed contacts which connect and disconnect, respectively, the signaling indicators at both side of the vehicle to and from a source of electrical energy.

The hazard warning signals may be canceled by manual movement of the hazard warning actuating member from its operative position to its inoperative position, but it is preferred that the hazard warning signals also be cancelable automatically in response to turning movement of the vehicle's steering mechanism. Automatic canceling of the hazard warning signals may be effected by the same canceling means which is utilized to eflect automatic cancelation of the direction signaling indicator by the provision of a part on the hazard warning actuator which, in the operative position of the latter, projects into the path of movement of the canceling means. Such an arrangement requires that the actuating member be capable of being held yieldably in its operative position in readiness to be engaged by the canceling means and that the actuating member be capable of restoration to its operative position upon its engagement with the canceling means, regardless of which direction in which the steering mechanism is turned.

One of the principal objects of this invention is to provide manually settable, automatically cancelable actuating means for hazard warning signaling devices and incorporating improved means for latching the actuating means in its operative position.

Another object of the invention is to provide hazard warning actuating means wherein the actuating means is latched in its operative position by a combination of inherent latching forces and a mechanical latching device.

A further object of the invention is to provide hazard warning actuating means of the character described and wherein the provision of the mechanical latching device does not necessitate enlargement of the structure of the actuating means.

Another object of the invention is to provide hazard warning actuating mechanism of the character referred to having spring means biasing the actuator to its inoperative position and wherein the spring means also is utilized to assist in the retention of the latching device in its proper position.

Other objects and advantages of the invention will be pointed out specifically or will become apparent from the following description when it is considered in conjunction with the appended claims and the accompanying drawings, in which:

FIGURE 1 is a fragmentary view, partly in section and partly in top plan, of a hazard warning switch actuating mechanism constructed in accordance with the invention, certain parts being broken away for purposes of illustration;

FIGURE 2 is a transverse sectional view taken on the line 2—2 of FIGURE 1;

FIGURE 3 is a longitudinal sectional view taken on the line 3—3 of FIGURE 1 and illustrating the actuating member and its associated parts in their inoperative positions;

FIGURE 4 is a view similar to FIGURE 3, but illustrating the parts in their operative positions; and FIGURE 5 is an enlarged, elevational view of a latching spring.

Apparatus constructed in accordance with the invention is adapted for use in conjunction with a vehicle having a rotatable steering shaft 1 provided with one or more cams 2 which rotate in a path in response to the rotation of the steering shaft about its axis. The cam or cams 2 conventionally are operable to cancel an actuated direction signal switch. The shaft 1 customarily is mounted in a tubular column 3 at the upper end of which is a housing 4. The housing 4 forms a support for direction signal operating apparatus (not shown) and for hazard warning signal operating mechanism constructed in accordance with the invention.

The hazard warning actuating mechanism comprises a casing 5 composed of insulating material and having an upper half 6 and a lower half 7, the two halves having confronting flanges 8 and 9, respectively, which are secured to one another by rivets 10 or the like. The lower half 7 of the casing includes mounting ears 11 which may be secured to the column 4 by means of screws 12, one of which is shown in FIGURE 1.

Within the casing 5 is a hollow chamber 13 terminating at one end in a forward wall 14 in which is an opening 15. The opposite or rearward end of the chamber terminates in a wall provided with an opening surrounded by a collar 16. Within the chamber 13 is mounted a reciprocable actuator or operating member 17 formed of electrical insulating material. One end of the operating member 17 projects through the collar 16 and terminates in a finger piece or knob 18, and the opposite or forward end of the actuating member extends through the opening 15 and terminates in a beveled or wedge-shaped tip 19.

Between its ends the actuator 17 has a pair of laterally extending flanges 20 and 21 and a pair of transverse ribs 22 and 23, the flanges and the ribs extending in different planes and terminating at their forward ends in the same plane. Mounted on the actuator 17 for movement with the latter is an electrically conductive member 24 having a planar body 25 provided with upper and lower sets of contact fingers. The fingers of the upper set are designated by the reference characters 26, 27 and 28 and the fingers of the lower set are designated by similar reference characters followed by the suffix *a*. The fingers of each set are bent over their associated ribs 22 and 23 so that the ribs provide fulcrums about which the respective fingers may rock. The free end of each finger is bent inwardly of the casing 5 so as to provide each finger with a knee 29 which is capable of sliding along the inner surface of the chamber 13.

The upper half 6 of the casing 5 is provided with a plurality of fixed contacts 30, 31 and 32 connected by conductors 33, 34 and 35 to a source of intermittent electrical energy and to appropriate signaling indicators. The lower half 7 of the casing 5 is provided with similar fixed contacts and conductors which are designated by the same reference characters, followed by the suffix *a*. The fixed contact 0 has a crowned head 36 which projects into the chamber 13 in the path of movement from the contact finger 26, the fixed contact 31 has a similar head 37 which projects into the chamber 13 in the path of the contact finger 27, and the fixed contact 32 has a similar head (not shown) which projects into the chamber 13 in the path of the contact finger 28. The fixed contacts in the lower half of the casing have similar heads which lie in the paths of the respective fingers which correspond to the fingers 26, 27 and 28, the finger corresponding to the finger 27 being shown at 27*a* in FIGURE 3.

The contact fingers of the conductive element 24 are bent slightly rearwardly from the plane of the body 25 so as to have a normal or unstressed position extending rearwardly from the body, but when the conductor 24 is assembled with the two casing halves 6 and 7, the fingers are subjected to considerable rearward bending force about the fulcrum points 22 and 23. The fingers have a normal tendency to return to their normal or unstressed position, thereby causing the knees 29 of the spring fingers forcibly but yieldably to be maintained in sliding engagement with the respective inner surfaces of the chamber 13. The arrangement is such that, however when a knee of a spring contact finger engages the head of one of the fixed contacts, the finger is cammed inwardly, against the inherent resistive force of the finger, so as to enable the knee to follow the contour of the fixed contact.

The conductor 24 is maintained in abutting relation with the forward ends of the flanges 20 and 21 and with the forward ends of the ribs 22 and 23 by a compression spring 39 which surrounds the shank 40 of the actuator member 17 and is interposed between the conductor 24 and the forward wall 14 of the casing 5. The spring 39 acts on the actuator 17 so as constantly to bias the latter to the right, as viewed in FIGURES 1 and 3, to an inoperative position in which the fingers 27, 27*a* engage the heads 37, 37*a* of the fixed contacts 31, 31*a*. In the inoperative position of the actuator 17 the signalling indicators are not energized, but a circuit between the contacts 31, 31*a* can be completed via the conductor 24, if desired. Movement of the actuator member 17 to the right is limited by abutments 41 which lie in the path of movement of the flanges 20 and 21.

The actuator 17 may be moved to the left from its inoperative position, shown in FIGURE 3, to its operative position shown in FIGURE 4 by means of the finger piece 18. As the member 17 moves to the left, the conductor 24 also will move to the left, compressing the spring 39. As the conductor 24 moves to the left, the spring fingers 26, 28 and the corresponding fingers on the opposite sides of the finger 27*a* will pass over their respective fixed contacts to a position in which the knees 29 bear against the forward edges of the heads and exert a force on the actuating member 17, tending to hold the latter in its operative position. Stated differently, when the fingers 26, and the corresponding fingers on the opposite sides of the finger 27*a* are in the operative position shown in FIGURE 4, movement of the actuator to the right requires that the fingers be deflected inwardly of the casing in order to pass by the heads of the associated fixed contacts. The inherent resistance of the spring fingers to such deflection exerts a restraining force on the actuator 17 tending to maintain it in its operative position.

In the operative position of the actuator 17 the beveled tip 19 lies in the path of rotation of the cam 2. Thus, rotation of the steering shaft 1 in either direction from the position shown in FIGURE 1 will effect engagement between the cam 2 and the projected tip 19. Engagement between the cam 2 and the tip 19 will cause a force of such magnitude to be exerted on the actuator as to overcome the restraining force of the spring fingers of the conductor 24 so as to initiate movement of the actuator toward its inoperative position. Movement of the actuator to its inoperative position is completed by the force of the spring 39.

The apparatus thus far described corresponds substantially to that disclosed in copending application Ser. No. 561,620, filed June 29, 1966 now Patent No. 3,371,172, granted Feb. 27, 1968. The present apparatus differs from that disclosed in such application primarily in the provision of auxiliary spring latching means to assist the conductor 24 in holding the actuator 17 in its operative position.

The auxiliary latching means comprises a generally U-shaped spring element 42 having a pair of arms 43 and 44 joined at corresponding ends by a bight 45. The free ends of the arms 43 and 44 are bent to form diverging terminal portions 46 and 47, respectively. The length of the spring member 42 is greater than the width of the casing chamber 13, but the sides of the latter adjacent the front wall 14 are provided with slots 48 and 49, in each of the casing halves, and of such depth as to enable the spring 42 to be accommodated within the chamber 13 and lie athwart the axis of the actuator 17 with the legs 43 and 44 straddling the shank 40 of the actuator.

The actuator shank 40 is provided with upper and lower flat surfaces 50 and 51, the upper and lower surfaces being interrupted by upstanding detents or rigs 52 and 53, respectively. The detents 52 and 53 are capable of being accommodated in the opening 15, but project beyond the arms 43 and 44 of the spring latch 42. Thus, when the actuator 17 is moved from its inoperative position to its operative position, the detents 52 and 53 engage the spring arms 43 and 44, respectively. The forward and rearward surfaces of the detents are inclined, as is shown in FIGURE 3, so that they may exert forces on the spring arms 43 and 44 in such directions as to tend to spread the arms apart a distance sufficient to enable the detents 52 and 53 to pass from one side of the spring to the other. The tendency of the spring arms to spread apart is resisted by the ends 46 and 47 of the respective spring arms, however, which engage the base of the slot 49. Accordingly, the arms 43 and 44 bow, rather than spread apart, to pass the detents 52 and 53. Once the detents have passed from one side of the spring to the other, the resilience of the arms 43 and 44 returns them to their original positions.

When the actuator 17 is in the operative position shown in FIGURE 4, the spring 42 lies rearwardly of the detents 52 and 53 and cooperates with the spring fingers of the conductor 24 in overcoming the force of the spring 39, thereby assuring retention of the actuator member 17 in its operative position. When the cam 2 engages the projected actuator tip 19, however, the actuator is moved rearwardly, as explained previously, whereupon the detents 52 and 53 bow the spring arms 43 and 44 so as to enable the spring 39 to restore the actuator to its inoperative position.

The location of the detents 52 and 53 are such that, when the actuator is in its inoperative position, movement of the actuator toward its operative position initially is resisted by the latch 42. Inadvertent operation of the hazard warning signals thus is avoided.

An important characteristic of the invention is that, when the actuator is in its operative position shown in FIGURE 4, the spring 39 is in its most compressed condition and one of its ends bears directly on the spring 42. Thus, the spring 39 counteracts any tendency on the part of the detents 52 and 53 to unseat the spring 42 from the slots 48 and 49 when the actuator is moved toward its inoperative position.

Another important characteristic of the invention is that the arrangement of the spring 42 in a direction transverse to the path of movement of the actuator makes it possible to avoid enlargement of the casing 5. Thus, utilization of the auxiliary latching means does not require any additional space to be provided in the cramped confines of the steering column housing 4.

This disclosure is representative of the presently preferred embodiment of the invention, but is intended to be illustrative rather than definitive thereof. The invention is defined in the claims.

What is claimed is:

1. A switch construction comprising a casing; fixed contacts supported by said casing; an operating member mounted in said casing for reciprocating movements along a path between first and second positions; conductive means carried by said operating member for movement therewith into and out of engagement with selective one of said contacts; biasing means acting on said operating member and urging the latter in one direction toward one of said positions; detent means carried by said operating member for movement therewith; and resilient latch means supported by said casing in spaced relationship to said contacts and positioned transversely in the path of movemnt of said detent means and displaceable thereby, said latch means and said detent means being operable yieldably to overcome said biasing means and maintain said operating member in the other of said positions.

2. The construction set forth in claim 1 wherein said casing has openings at opposite ends thereof and through which opposite ends of said operating member may project.

3. The construction set forth in claim 1 wherein said latch means comprises at least one spring arm supported at its opposite ends only.

4. The construction set forth in claim 1 wherein said latch means comprises a pair of spring arms respectively overlying and underlying said operating member and being supported at their opposite ends only.

5. The construction set forth in claim 4 wherein said spring arms are joined to one another.

6. The construction set forth in claim 3 wherein said detent means comprises a projection on said operating member of such axial length and so positioned on said operating member as to traverse said spring arm as said operating member moves from either one of its positions toward the other, 7. The construction set forth in claim 1 wherein said conductive means acts on selected ones of said fixed contacts to exert a yieldable force on said operating member in said other position thereof in opposition to said biasing means.

8. The construction set forth in claim 1 wherein said casing has slots at opposite sides thereof in which opposite ends of said latch means are accommodated.

9. A switch construction adapted for use with a cam movable in a path, said construction comprising a casing; means for mounting said casing adjacent the path of movement of said cam; a plurality of fixed contacts supported by said casing; an operating member mounted in said casing for movements along a path from a first position in which one end thereof extends beyond one end of said casing to a second position in which the other end of said operating member extends beyond the other end of said casing and lies in the path of said cam; conductive means carried by said operating member and movable therewith into and out of engagement with selected ones of said fixed contacts in response to movement of said operating member between said first and second positions; detent means carried by said operating member; resilient latch means carried by said casing at one of its ends and extending wholly athwart said path, said latch means being engageable with said detent means when said operating member is in said second position for releasably holding said operating member in said second position, said operating member being displaceable a sufficient distance in a direction toward said first position upon engagement between said operating member and said cam to effect release of said detent means by said latch means; and spring means acting on said operating member for urging the latter to said first position.

10. The construction set forth in claim 9 wherein said latch means comprises a generally U-shaped spring having its opposite ends received in slots formed in opposite sides of said casing.

11. The construction set forth in claim 10 wherein said spring means also acts on said latch means to maintain the latter at said one of the ends of said casing.

12. The construction set forth in claim 10 wherein said U-shaped spring has a pair of generally parallel arms which straddle said operating member and wherein said detent means comprises a pair of projections, one on each of two sides of said operating member, and engageable with a respective one of said arms.

13. The construction set forth in claim 10 wherein the free ends of said spring diverge and seat against the bottom of the slot in which they are received.

References Cited

UNITED STATES PATENTS

| | | | |
|---|---|---|---|
| 2,347,874 | 5/1944 | Bluemle | 200—77 |
| 1,316,900 | 9/1919 | Klein | 200—77 |
| 1,326,619 | 12/1919 | Sweet | 200—78 |
| 3,354,731 | 11/1967 | Kussmaul | 200—153.12 |

ROBERT K. SCHAEFER, Primary Examiner